United States Patent
Ryczek et al.

(10) Patent No.: US 7,104,233 B2
(45) Date of Patent: Sep. 12, 2006

(54) ENGINE OIL HEATER

(75) Inventors: Stephen J. Ryczek, Hartland, WI (US); James D. Makiya, Wauwatosa, WI (US); William M. Kindness, Franklin, WI (US); Kyle Clasen, Hartford, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 11/111,266

(22) Filed: Apr. 21, 2005

(65) Prior Publication Data

US 2005/0235945 A1    Oct. 27, 2005

(51) Int. Cl.
*F02N 17/02* (2006.01)
*B60L 1/02* (2006.01)

(52) U.S. Cl. ................ 123/142.5 E; 219/205
(58) Field of Classification Search ......... 123/142.5 E; 219/205
See application file for complete search history.

(56) References Cited

U.S. PATENT DOCUMENTS

| | | | |
|---|---|---|---|
| 1,358,526 A | 11/1920 | Coulter |
| 1,894,887 A | 1/1933 | Pingrey |
| 2,266,985 A | 12/1941 | Morgan et al. |
| 2,371,696 A | 3/1945 | Levitt |
| 2,389,925 A | 11/1945 | Morgan et al. |
| 2,432,169 A | 12/1947 | Morgan et al. |
| 2,551,770 A | 5/1951 | Smith |
| RE23,449 E | 1/1952 | Freeman |
| 2,611,066 A | 9/1952 | Freeman |
| 2,629,041 A | 2/1953 | Fein et al. |
| 2,641,239 A | 6/1953 | Grinde et al. |
| 3,171,015 A | 2/1965 | Grinde |
| 3,251,017 A | 5/1966 | Okerstrom |
| 3,798,072 A | 3/1974 | Anderson |
| 3,824,370 A | 7/1974 | Kucera |
| 3,970,816 A | 7/1976 | Hosokawa et al. |
| 4,480,174 A | 10/1984 | Hummel |
| 4,754,124 A * | 6/1988 | Howell et al. ............... 219/523 |
| 5,828,810 A | 10/1998 | Frank et al. |
| 6,600,136 B1 | 7/2003 | Morris et al. |

FOREIGN PATENT DOCUMENTS

JP          6212934 A       8/1994

* cited by examiner

*Primary Examiner*—Noah P. Kamen
(74) *Attorney, Agent, or Firm*—Michael Best & Friedrich, LLP

(57) ABSTRACT

An engine oil heater suited to use with an engine having an oil fill port in fluid communication with an oil reservoir that is adapted to contain a quantity of oil. The engine heater generally includes a coupling member operable to engage the oil fill port and a heater element interconnected with the coupling member and having a sufficient length such that the heater element is adapted to be at least partially immersed in oil. A temperature sensor is positioned to measure a temperature and a first electrical connector is configured to engage a second electrical connector. The first electrical connector is electrically connectable to the heater element to provide a flow of current and a control circuit is operable to vary the flow of current to the heater element in response to the measured temperature.

31 Claims, 3 Drawing Sheets

ENGINE OIL HEATER

BACKGROUND

The present invention relates generally to an engine oil heater. More particularly, the present invention relates to an electric engine oil heater for use with an engine that operates in a cold environment.

Snow throwers and other cold weather equipment often use small engines to provide the necessary power. Typically, these engines use a lubricant, such as oil to lubricate moving parts and to cool parts during operation. However, during long periods of inactivity in a cold environment, the oil collects and the viscosity of the oil is substantially increased. The higher viscosity reduces the ability of the oil to lubricate the moving parts and makes it more difficult to start the engine.

SUMMARY

The present invention provides an engine oil heater suited to use with an engine having an oil fill port in fluid communication with an oil reservoir that is adapted to contain a quantity of oil. The engine heater generally includes a coupling member operable to engage the oil fill port and a heater element interconnected with the coupling member and having a sufficient length such that the heater element is adapted to be at least partially immersed in oil. A temperature sensor is positioned to measure a temperature and a first electrical connector is configured to engage a second electrical connector. The first electrical connector is electrically connectable to the heater element to provide a flow of current and a control circuit is operable to vary the flow of current to the heater element in response to the measured temperature.

In another aspect, the invention generally provides an engine including a cylinder and a piston positioned to reciprocate within the cylinder. An air/fuel mixing device is operable to receive a flow of air and a flow of fuel and deliver a flow of an air/fuel mixture to the cylinder. The engine also includes a lubrication system including an oil reservoir having an oil fill port and a quantity of oil. The lubrication system is operable to provide lubricating oil to at least one of the piston and the cylinder. A heater element is coupled to the fill port such that the heater element is at least partially immersed in the quantity of oil. A temperature sensor is positioned to measure a temperature and a first electrical connector is configured to engage a second electrical connector. The first electrical connector is directly connectable to the heater element to provide a flow of power and a control circuit is operable to vary the flow of power to the heater element in response to the measured temperature.

In still another aspect, the present invention generally provides an engine heater suited to use with an engine having an oil fill port in fluid communication with an oil reservoir that is adapted to contain a quantity of oil. The engine heater includes a coupling member operable to engage the engine and a heater element interconnected with the coupling member such that the heater element is adapted to be at least partially immersed in oil when the coupling member engages the engine. A sensor is positioned to measure an engine temperature and a first electrical connector is configured to engage a second electrical connector. The first electrical connector is directly connectable to the heater element to provide a flow of power and a control circuit is operable to vary the flow of power to the heater element in response to the measured temperature.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
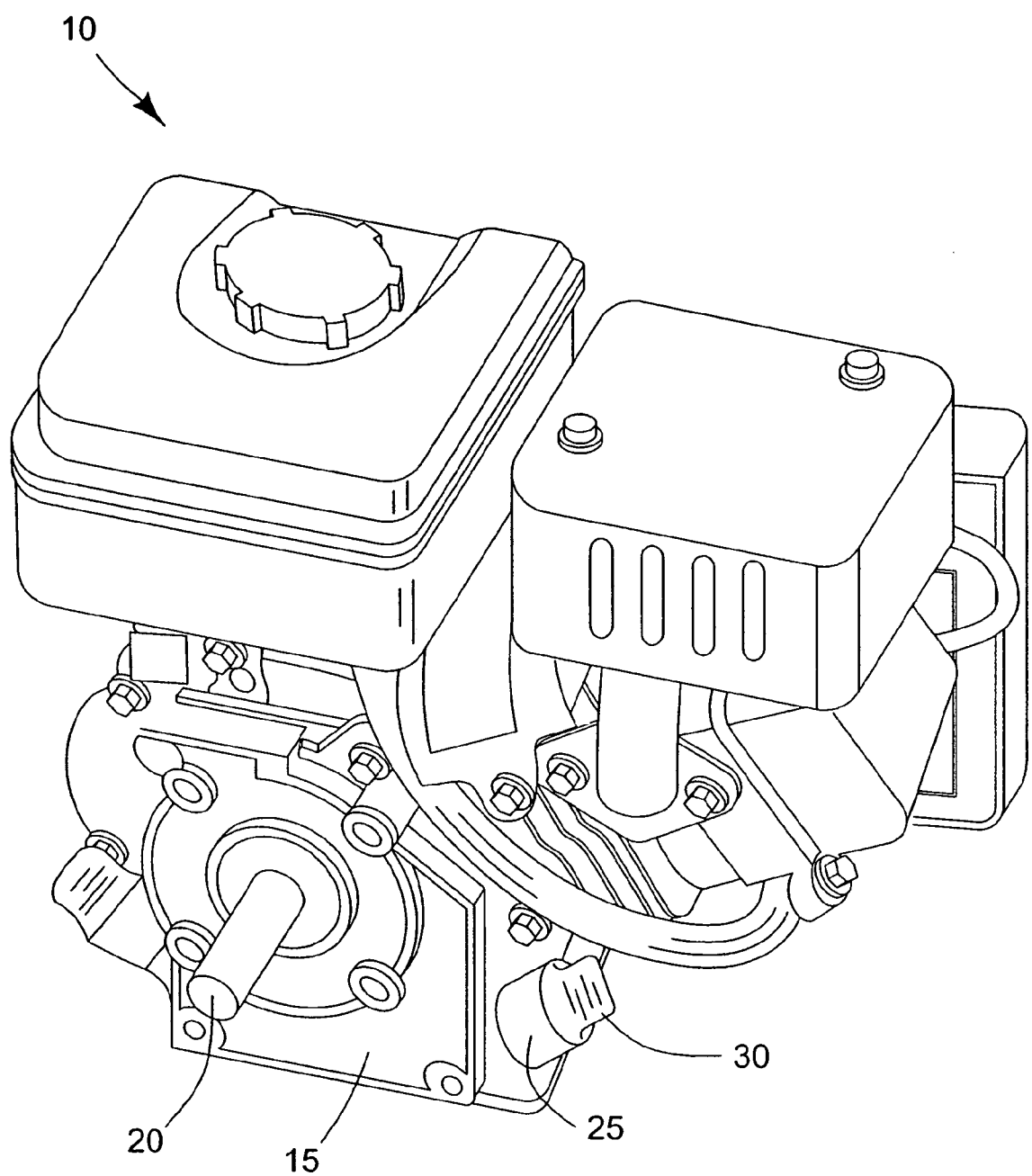
FIG. 1 is a perspective view of an engine.

With reference to FIG. 1, a horizontal shaft engine 10 is illustrated. The engine 10 includes a cylinder and a housing 15. The cylinder supports a piston for reciprocation and at least partially defines a combustion chamber. The piston drives a crankshaft 20, which extends out of the housing 15 to provide usable power. A lubricant, such as motor oil, circulates throughout the engine 10 and lubricates the various moving parts. The lubricant both reduces engine wear and cools the moving components. The lubricant drains into the bottom of the housing 15 and is pumped to the various locations that require lubricant. During idle periods, the lubricant collects in the bottom of the housing 15.

The engine 10 includes an oil fill port 25 having an aperture 27 that receives a cap 30 that covers the aperture 27 during engine operation. In some engines 10, the cap 30 also functions as a lubricant dipstick that allows the user to measure the quantity of lubricant in the housing 15. The oil fill port 25 provides access to the housing 15 to allow for the addition and/or removal of lubricant.

Figure 2:
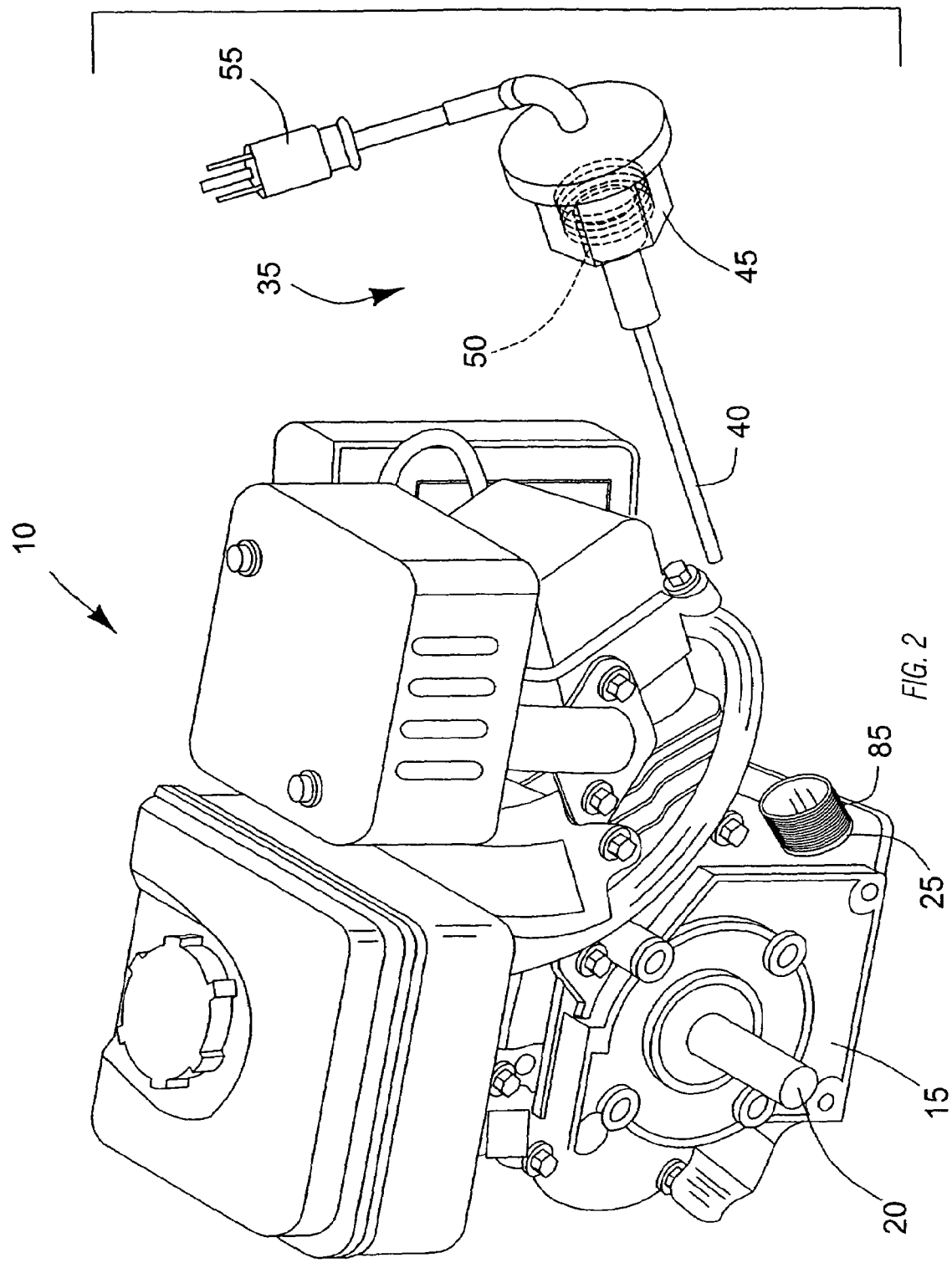
FIG. 2 is an exploded view of the engine and engine oil heater.
Figure 3:
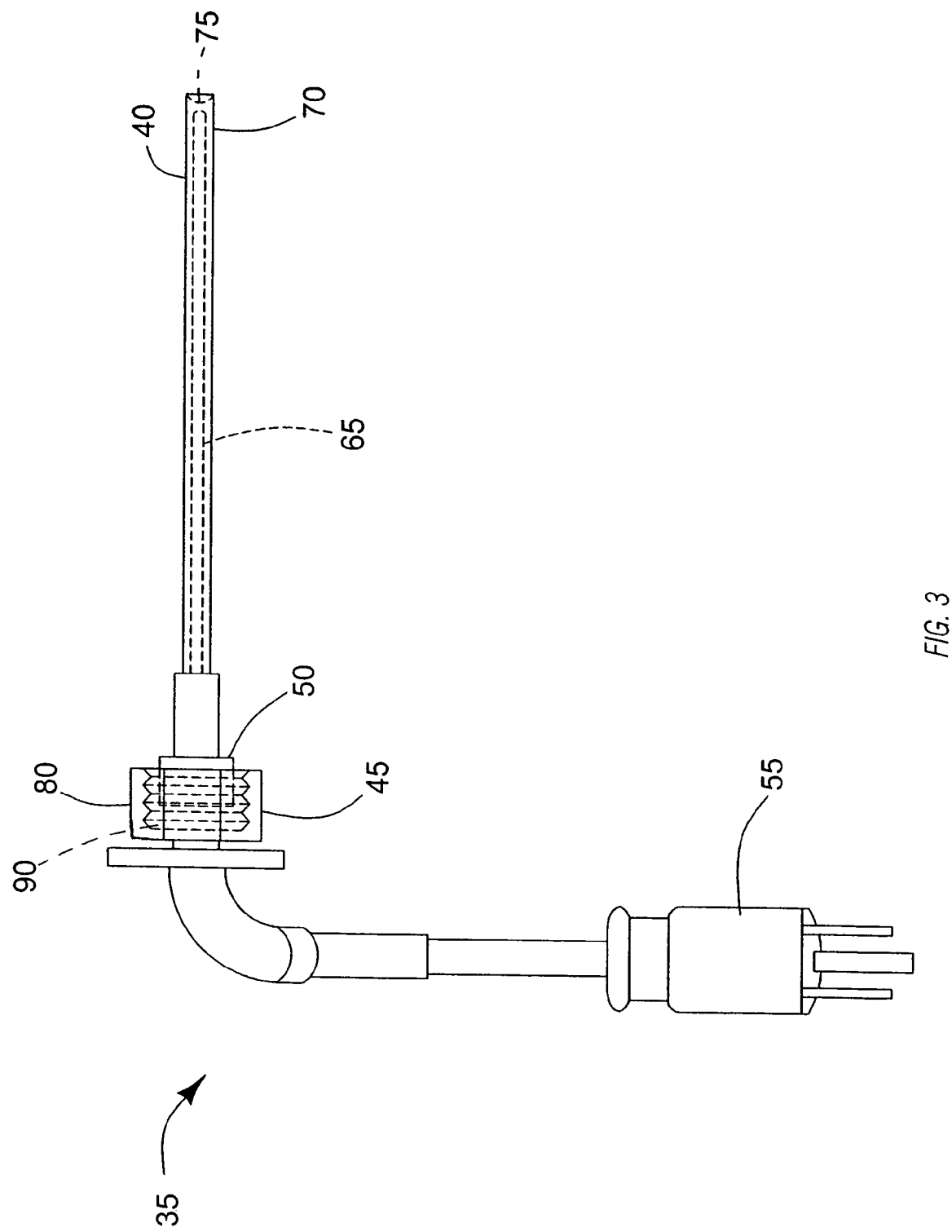
FIG. 3 is a side view of the engine oil heater of FIG. 2.

With reference to FIG. 2, the engine 10 is illustrated with the oil fill cap 30 removed to receive an engine oil heater 35. The engine oil heater 35, illustrated in FIG. 3, includes a heater element 40, an attachment member 45, a control element 50, and an electrical connector 55. The heater element 40 includes a conductor 65 that gets hot in response to a flow of current therethrough. A casing 70 surrounds the conductor 65 and at least partially forms a seal that inhibits contact between the lubricant and the conductor 65. The casing 70 is heated by the hot conductor 65 disposed within the casing 70, which in turn heats the lubricant. In other constructions, the conductor 65 is formed as part of the casing 70, or the casing 70 itself acts as the conductor 65. In some constructions, the casing 70, or the conductor 65 and casing 70 combination, is flexible thereby allowing the user to shape it to fit within the particular engine 10.

To heat the casing 70, an electrical current is provided to the conductor 65. In most constructions, a single phase AC current (e.g., 120 V, 240 V) provides the current flow to the conductor 65. However, other constructions may use three-phase power or a DC power supply to provide the necessary current.

A temperature sensor, such as a thermocouple 75 is positioned within the casing 70 to measure a temperature. In most constructions, the thermocouple 75 measures the temperature of the casing 70, which is then used to estimate an actual lubricant temperature. However, other constructions may position the thermocouple 75 adjacent an outer surface of the casing 70 to allow it to directly measure the lubricant temperature. While a thermocouple 75 has been described, other temperature sensors (e.g., thermistors, RTDs, bimetallic thermometers, and the like) are also suited for use with the present invention.

The attachment member 45 facilitates the secure attachment of the engine oil heater 35 to the engine 10. The attachment member 45 includes a free spinning nut 80 with internal threads sized and pitched to engage threads 85 on the oil fill port 25. In other constructions, a cammed nut is employed. The cammed nut requires less than a full turn to lock the engine oil heater 35 to the engine 10. The attachment member 45 may also include a soft member 90 that engages the nut 80 and oil fill port 25 at their interface to provide a seal. The seal inhibits the entry of moisture or dirt into the oil and/or the spilling or loss of oil from the housing 15. Suitable soft materials include but are not limited to rubber, cloth, and nylon. In some constructions, no soft member 90 is employed. Rather, the connection between the nut 80 and the oil fill port 25 is relied upon to maintain the seal.

A conductor 95 extends beyond the attachment member 45 and interconnects the electrical connector 55 and the heating element 40. The electrical connector 55 is formed to fit another electrical connector (e.g., three-pronged 120 V grounded outlet). Of course, other connectors 55 may be used to allow the engine oil heater 35 to connect to other sources of power (e.g., three-phase power, high-voltage power, DC power, and the like).

The control element 50, disposed within the electrical circuit between the electrical connector 55 and the heating element 40, functions in response to the temperature of the lubricant to vary the current flow to the heater element 40. In one construction, the control element 50 simply interrupts the power flow (e.g., reduces the voltage or the current to the heater element) when the temperature sensed by the thermocouple 75 exceeds a predetermined value (e.g., 150 degrees F.). The control element 50 reinitiates power flow when the temperature sensed by the thermocouple 75 falls below a predetermined value (e.g., 100 degrees F.). Thus, the control element 50 acts as a switch that is either on or off. In another construction, the control element 50 actively varies the power flow to the heater element 40 in an effort to maintain the temperature sensed by the thermocouple 75 near a predetermined value (e.g., 120 degrees F.). In this construction, the power flow (i.e., the current and/or the voltage) is reduced in response to a temperature above the target value and is increased in response to a measured temperature below the target value. Rather than turning power on or off, the power flow varies between zero and a predetermined maximum. Thus, the actual temperature of the lubricant is maintained within a small operational range that assures that the oil provides adequate lubrication and cooling for the engine 10.

To use the engine oil heater 35, the cap 30 covering the aperture 27 in the oil fill port 25 is removed. The engine oil heater 35 is then partially inserted into the aperture 27 such that at least a portion of the casing 70 and/or the conductor 65 is disposed within the oil. The free spinning nut 80 is tightened to provide an adequate seal between the engine oil heater 35 and the engine 10. The connector 55 is then connected to a power supply and the engine oil heater 35 begins heating the engine oil. No monitoring of the engine oil heater 35 is required, as the control element 50 will assure that the engine oil is not overheated. With the engine oil heated to a suitable temperature, the engine 10 can be started easily and the oil provides the desired lubrication and cooling to the moving parts.

Although the invention has been described in detail with reference to certain preferred embodiments, variations and modifications exist within the scope and spirit of the invention as described and defined in the following claims.

What is claimed is:

1. An engine oil heater suited to use with an engine having an oil fill port in fluid communication with an oil reservoir that is adapted to contain a quantity of oil, the engine heater comprising:
   a coupling member operable to engage the oil fill port;
   a heater element interconnected with the coupling member and having a sufficient length such that the heater element is adapted to be at least partially immersed in oil;
   a temperature sensor positioned to measure a temperature;
   a first electrical connector configured to engage a second electrical connector, the first electrical connector electrically connectable to the heater element to provide a flow of current; and
   a control circuit disposed substantially within the oil reservoir that is operable to vary the flow of current to the heater element in response to the measured temperature.

2. The engine heater of claim 1, wherein the coupling member includes a free-spinning nut that threadably engages the oil fill port.

3. The engine heater of claim 1, wherein the oil fill port includes threads, and the coupling member includes threads sized to engage the oil fill port threads.

4. The engine heater of claim 3, wherein the coupling member includes a free-spinning nut that threadably engages the threads of the oil fill port.

5. The engine heater of claim 1, wherein the temperature sensor includes a thermocouple.

6. The engine heater of claim 1, wherein the temperature sensor measures an oil temperature.

7. The engine heater of claim 1, wherein the control circuit substantially reduces current flow to the heater element when the measured temperature exceeds a predetermined value.

8. The engine heater of claim 7, wherein the measured temperature is an oil temperature, and wherein the control circuit substantially reduces current flow to the heater element when the oil temperature exceeds about 140 degrees F.

9. The engine heater of claim 1, wherein the control circuit reduces the current flow to the heater element in response to an increase in the measured temperature.

10. The engine heater of claim 1, wherein the control circuit varies a voltage applied to the heater element in response to the measured temperature.

11. An engine comprising:
    a cylinder;
    a piston positioned to reciprocate within the cylinder;
    a fuel/air mixing device operable to receive a flow of air and a flow of fuel and deliver a flow of an air/fuel mixture to the cylinder;
    a lubrication system including an oil reservoir having an oil fill port and a quantity of oil, the lubrication system operable to provide lubricating oil to at least one of the piston and the cylinder;
    a heater element coupled to the fill port such that the heater element is at least partially immersed in the quantity of oil;
    a temperature sensor positioned to measure a temperature;

a first electrical connector configured to engage a second electrical connector, the first electrical connector directly connectable to the heater element to provide a flow of power; and a control circuit disposed substantially within the oil reservoir that is operable to vary the flow of power to the heater element in response to the measured temperature.

12. The engine of claim 11, wherein the heater element includes a coupling member that engages the fill port.

13. The engine of claim 12, wherein the coupling member includes a free-spinning nut that threadably engages the fill port.

14. The engine of claim 12, wherein the oil fill port includes threads and the coupling member includes threads sized to engage the oil fill port threads.

15. The engine of claim 14, wherein the coupling member includes a free-spinning nut that threadably engages the threads of the oil fill port.

16. The engine of claim 11, wherein the temperature sensor includes a thermocouple.

17. The engine of claim 11, wherein the temperature sensor measures an oil temperature.

18. The engine of claim 11, wherein the control circuit substantially reduces power flow to the heater element when the measured temperature exceeds a predetermined value.

19. The engine of claim 18, wherein the measured temperature is an oil temperature, and wherein the control circuit substantially reduces power flow to the heater element when the oil temperature exceeds about 140 degrees F.

20. The engine of claim 11, wherein the control circuit varies a current flow to the heater element in response to the measured temperature.

21. The engine of claim 11, wherein the control circuit varies a voltage applied to the heater element in response to the measured temperature.

22. An engine heater suited to use with an engine having an oil fill port in fluid communication with an oil reservoir that is adapted to contain a quantity of oil, the engine heater consisting essentially of:

a coupling member operable to engage the engine;

a heater element interconnected with the coupling member such that the heater element is adapted to be at least partially immersed in oil when the coupling member engages the engine;

a sensor positioned to measure an engine temperature;

a first electrical connector configured to engage a second electrical connector, the first electrical connector directly connectable to the heater element to provide a flow of power; and a control circuit disposed substantially within the oil reservoir that is operable to vary the flow of power to the heater element in response to the measured temperature.

23. The engine heater of claim 22, wherein the coupling member includes a free-spinning nut that threadably engages the oil fill port.

24. The engine heater of claim 22, wherein the oil fill port includes threads and the coupling member includes threads sized to engage the oil fill port threads.

25. The engine heater of claim 24, wherein the coupling member includes a free-spinning nut that threadably engages the threads of the oil fill port.

26. The engine heater of claim 22, wherein the temperature sensor includes a thermocouple.

27. The engine heater of claim 22, wherein the temperature sensor measures an oil temperature.

28. The engine heater of claim 22, wherein the control circuit substantially interrupts the flow of power when the measured temperature exceeds a predetermined value.

29. The engine heater of claim 28, wherein the measured temperature is an oil temperature, and wherein the control circuit substantially reduces power flow to the heater element when the oil temperature exceeds about 140 degrees F.

30. The engine heater of claim 22, wherein the control circuit varies a current flow to the heater element in response to the measured temperature.

31. The engine heater of claim 22, wherein the control circuit varies a voltage applied to the heater element in response to the measured temperature.

* * * * *